US011205206B2

(12) United States Patent
Saley et al.

(10) Patent No.: US 11,205,206 B2
(45) Date of Patent: *Dec. 21, 2021

(54) DATA STORAGE DEVICE, METHOD AND SYSTEM, AND CONTROL OF DATA STORAGE DEVICE BASED ON WRITING OPERATIONS AND LIFETIME

(71) Applicant: Western Digital Technologies, Inc., San Jose, CA (US)

(72) Inventors: Jaimeson Saley, Rochester, MN (US); Ali Khalili, Bryon, MN (US); Nicholas Waara, Rochester, MN (US); Alexis Dani, Comstock Park, MI (US)

(73) Assignee: Western Digital Technologies, Inc., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/827,597

(22) Filed: Mar. 23, 2020

(65) Prior Publication Data

US 2020/0234352 A1  Jul. 23, 2020

Related U.S. Application Data

(63) Continuation of application No. 15/065,001, filed on Mar. 9, 2016, now Pat. No. 10,636,065.

(51) Int. Cl.
*G06Q 30/00* (2012.01)
*G06Q 30/04* (2012.01)
*G06F 3/06* (2006.01)

(52) U.S. Cl.
CPC ........... *G06Q 30/04* (2013.01); *G06F 3/0604* (2013.01); *G06F 3/067* (2013.01); *G06F 3/0653* (2013.01); *G06F 3/0688* (2013.01)

(58) Field of Classification Search
CPC ..................................................... G06Q 30/04
(Continued)

(56) References Cited

U.S. PATENT DOCUMENTS 8,458,011 B2   6/2013   Al-Dawsari et al.
8,504,443 B2   8/2013   Ferris et al.
(Continued)

FOREIGN PATENT DOCUMENTS

| CN | 103095471 | 5/2013 |
| CN | 103533043 | 1/2014 |
| WO | WO 2013/159291 | 10/2013 |

OTHER PUBLICATIONS

ProQuestNPL Search History.*
(Continued)

*Primary Examiner* — John H. Holly
(74) *Attorney, Agent, or Firm* — Morgan, Lewis & Bockius LLP (57) ABSTRACT

A method for determining a utilization-based fee for storing data includes determining a number of write operations for writing a quantity of data to a solid state drive (SSD) and determining an amount of a fee based on the number of write operations for writing the quantity of data to the SSD. A lifetime of the SSD can be determined based on, for example, the number of blocks in the SSD and the maximum number of write operations per block. A utilization factor for a particular workload can be determined by dividing the number of write operations in the workload by the lifetime. The value of the utilization factor can then be used to determine the amount of the fee. A bill based on the amount of the fee can be generated and transmitted.

20 Claims, 4 Drawing Sheets

(58) Field of Classification Search
USPC .............. 705/40, 1.1, 7.37, 7.12, 400, 7.33; 711/103, 162; 714/47.3; 707/610, 634, 707/637, 615
See application file for complete search history.

(56) References Cited

U.S. PATENT DOCUMENTS

| | | | |
|---|---|---|---|
| 9,026,662 | B2 | 5/2015 | Zhu et al. |
| 9,639,589 | B1* | 5/2017 | Theimer ............. G06F 11/1453 |
| 2012/0016721 | A1 | 1/2012 | Weinman |
| 2012/0123886 | A1 | 5/2012 | Brown et al. |
| 2014/0006237 | A1 | 1/2014 | Chiang et al. |
| 2014/0181595 | A1 | 6/2014 | Hoang |
| 2014/0214496 | A1 | 7/2014 | MacBeath et al. |
| 2015/0212735 | A1 | 7/2015 | Alcantara |
| 2016/0026984 | A1* | 1/2016 | Sagano ................ G06F 3/0608 705/40 |

OTHER PUBLICATIONS

Exertion-based billing for cloud storage access, https://labs.vmware.com/academic/publications/exertion-based-billing, Mar. 2011, 9 pages.
Microsoft Azure, https://azure.microsoft.com/en-in/documentation/articles/storage-premium-storage-preview-portal/, Apr. 2015, 13 pages.
Microsoft Azure, https://azure.microsoft.com/en-in/pricing/calculator, retrieved Mar. 18, 2016, 2 pages.
Microsoft Azure, https://azure.microsoft.com/en-in/pricing/details/storage/, retrieved Mar. 18, 2016, 7 pages.
NPL Search History, Feb. 6, 2020, 10 pages.

* cited by examiner

DATA STORAGE DEVICE, METHOD AND SYSTEM, AND CONTROL OF DATA STORAGE DEVICE BASED ON WRITING OPERATIONS AND LIFETIME

CROSS REFERENCE TO RELATED APPLICATIONS

This application is a continuation of application Ser. No. 15/065,001, filed on Mar. 9, 2016, now U.S. Pat. No. 10,636,065, the entirety of which is incorporated herein by reference for all purposes.

BACKGROUND

The use of solid state drives or devices (SSDs) instead of other storage media such as random access memory to store data presents some challenges, especially when that data is frequently updated. For instance, SSDs store data in blocks. To write data to a block, the block is first erased and then the new data is written to the block. However, a block can only be erased a limited number of times before wearing out. Thus, SSDs that are used to store data that changes frequently can quickly wear out. Wear leveling is used to distribute data writes among the blocks so that blocks do not fail prematurely, thereby extending the lifetime of SSDs. Nevertheless, each SSD will eventually wear out, some quicker than others.

In a cloud-based or storage-as-a-service (SaaS) environment, for example, storage service providers (SSPs) provide storage space and related services to customers (e.g., individuals, companies, and businesses). SSDs may be allocated on the fly depending on workload and other variables such as quality-of-service. The SSPs charge a fee (e.g., a monthly rate) based on the amount of drive space allocated to and/or used by the customer.

SSPs provide their services for profit and are therefore interested in improving the return on investment on the SSDs they purchase and implement as part of those services.

SUMMARY

Embodiments according to the invention introduce a tiered pricing schedule that places a higher fee on workloads that include more write operations, in contrast to conventional models of charging customers a fee that is based on the amount of storage space allocated and/or used. Therefore, in embodiments according to the invention, the fee charged to a customer for using an SSD considers the workload placed on the SSD by the customer. In an embodiment, the workload is measured in terms of the number of writes to the SSD performed for the customer.

For example, a workload for customer A may require more write operations to an SSD than a workload for customer B, and therefore customer A is expending a greater proportion of the SSD's lifetime for the reasons discussed above. However, if customers A and B are using the same amount of storage space on the SSD then, according to conventional pricing models, they would be charged the same amount. Thus, even though the overhead cost attributable to customer A is greater than that of customer B (because customer A is causing the SSD to wear out faster), both customers share the cost equally according to conventional pricing models. To put it another way, the SSP makes less profit off customer A than off customer B under conventional pricing models because both customers pay the same amount but there is more overhead associated with customer A than customer B.

However, using a tiered pricing schedule based on workload (e.g., number of write operations) as disclosed herein, customer A would be charged more and would pay more than customer B. Note that the tiered pricing schedule can be combined with the more traditional pricing model; for example, the amount of the fee charged to a customer can be based on both workload and the amount of drive space allocated and/or used.

In an embodiment according to the invention, a method for determining a utilization-based fee for storing data includes determining a number of write operations for writing a quantity of data to an SSD and determining an amount of a fee based on the number of write operations for writing that quantity of data to the SSD. In an embodiment, a bill based on the amount of the fee is generated and transmitted.

In an embodiment, the number of write operations is a predicted value. In another embodiment, the number of write operations is determined by counting the number of write operations performed while writing the quantity of data to the SSD.

In an embodiment, a lifetime of the SSD is determined (e.g., estimated). In an embodiment, the lifetime is based on the number of blocks in the SSD and the maximum number of write operations per block. The lifetime can be expressed in terms of units of number of write operations. A utilization factor for a particular workload can be determined by dividing the number of write operations in the workload by the lifetime. The value of the utilization factor can then be used to determine the amount of the fee. In an embodiment, the amount of the fee is determined using a tiered pricing schedule that bases the fee on the magnitude of the value of the utilization factor. Accordingly, a larger workload may result in a higher fee.

In such an embodiment, the number of write operations per customer is cumulative per customer per SSD. In other words, the total number of write operations to a particular SSD is counted for each customer. In this manner, a customer's utilization factor can increase over time, perhaps moving the customer to a higher tier in the pricing schedule. Accordingly, a customer that writes data frequently may pay a higher fee, even if the workload (e.g., number of write operations) is small each time data is written.

In summary, embodiments according to the present invention can result in a higher fee being charged for larger workloads (e.g., workloads that require more write operations) and/or for frequent writes. Essentially, a customer that incurs more costs is charged more, thereby maintaining a consistent profit margin across customers. Relative to conventional approaches, SSPs can receive a greater return on investment for each SSD that they deploy.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "accessing," "sending," "executing," "determining," "writing," "predicting," "counting," "subtracting," "adding," "using," "storing," "billing," "generating," "transmitting," or the like, refer to actions and processes (e.g., flowcharts 400 and 500 of FIGS. 4 and 5, respectively) of an apparatus or computer system or similar electronic computing device or processor (e.g., the system 100 of FIG. 1). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD or NVMD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
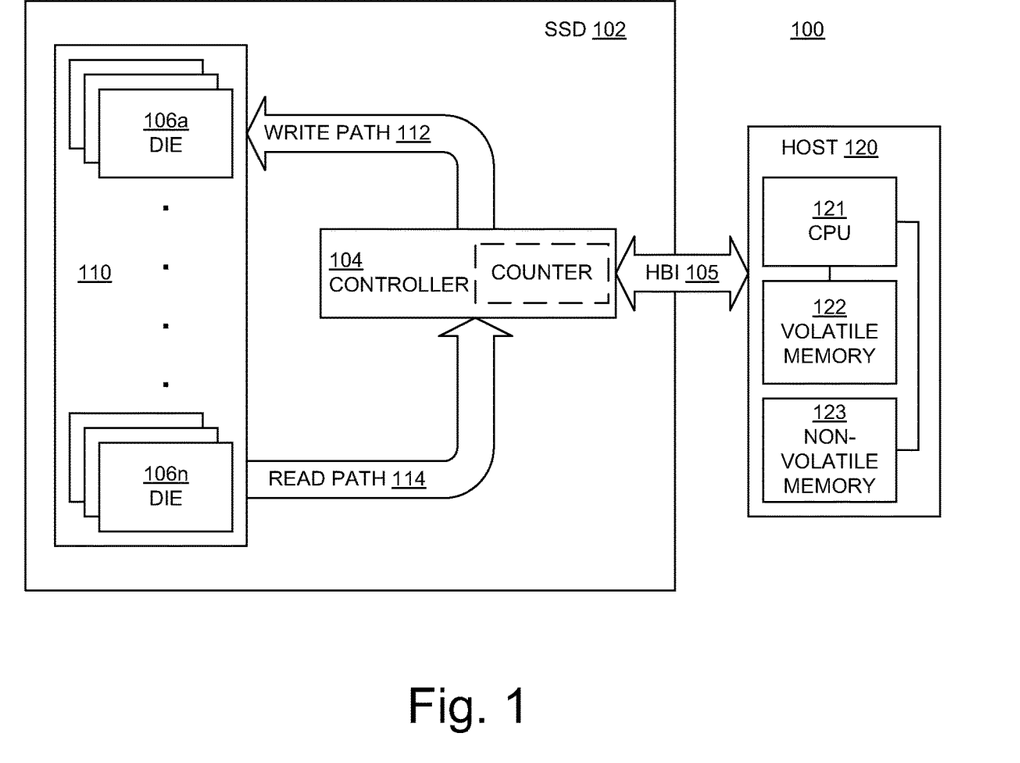
FIG. 1 a block diagram showing elements of a computer system upon which embodiments according to the present invention can be implemented.

FIG. 1 a block diagram showing elements of a computer system 100 upon which embodiments according to the present invention can be implemented. The system 100 may include elements other than those shown or described below.

In the example of FIG. 1, the system 100 includes a central processing unit (CPU) 121, volatile memory 122, and non-volatile memory 123. The volatile memory 122 may be, for example, dynamic random access memory (DRAM). The CPU 121, volatile memory 122, and non-volatile memory 123 (along with other elements, not shown) constitute what may be referred to as a host system 120. The host system 120 may include elements other than those shown or described herein.

The system 100 is coupled to or incorporates a solid state drive or device (SSD) 102, which may also be known as a non-volatile memory device (NVMD) or a flash memory device. There can be more than one such device (e.g., SSD) coupled to or included in the system 100; that is, a single host system can be coupled to more than one SSD. The host system 120 and the SSD 102 communicate via a host bus interface (HBI) 105 (e.g., a Peripheral Component Interconnect Express (PCIe) bus).

The SSD 102 includes a controller 104 that may be referred to as the master controller. The SSD 102 also includes a number of storage elements, specifically a chip array 110 that includes a number of dies or chips 106a-106n that are used to store data. In an embodiment, the dies 106a-106n include any practicable number of non-volatile memory elements such as NAND flash elements, and as such the SSD 102 may be referred to as a NAND flash device. Alternatively, the dies may include NOR flash elements. There may be any number of dies 106a-106n. The SSD 102 may include elements other than those shown or described.

The controller 104 can be implemented as an application-specific integrated circuit (ASIC) or field-programmable gate array (FPGA) that is embedded in the SSD 102. In general, the controller 104 includes control circuitry that facilitates reading, writing, erasing, and other operations on, for, and/or using the dies 106a-106n.

In an embodiment, the controller 104 includes or executes a flash translation layer (FTL) to translate logical block addresses from the host system 120 to physical addresses on the SSD 102. The controller 104 also includes or controls a write path 112 and a read path 114. The write path 112 may include a physical layer (PHY) interface and a serializer/deserializer that converts data between the analog and digital domains (from analog to digital, and from digital to analog). The write path 112 may also include a data compression block, an encryption block, and an error correction code (ECC) encoding block. The read path 114 may include an ECC decoding block, a decryption block, and a decompression block. The controller 104 is coupled to the dies 106a-106n via, for example, an Open NAND Interface (ONFI). A chip select signal is used by the controller 104 to locate, address, and/or activate a particular one of the dies 106a-106n.

Figure 2:
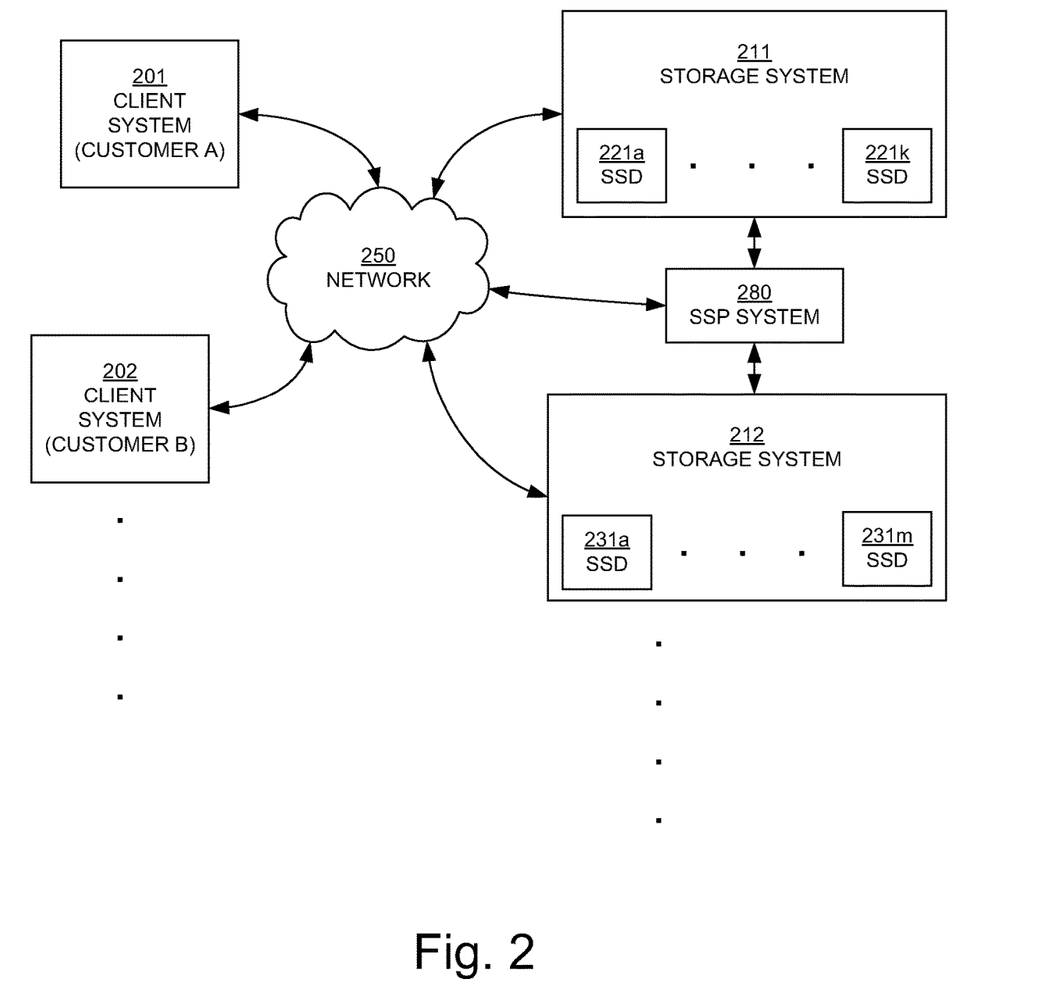
FIG. 2 is a block diagram of a network architecture upon which embodiments according to the present invention can be implemented.

FIG. 2 is a block diagram of a network architecture 200 upon which embodiments according to the present invention can be implemented. In the example of FIG. 2, the network architecture 200 includes a number of client systems, represented by the client systems 201 and 202, and a number of storage systems, represented by the storage systems 211 and 212, coupled communicatively via a network 250. There can be any number of client systems and storage systems.

The client systems 201 and 202 generally represent any type or form of computing device or system. The network 250 generally represents any wired (including optical fiber) or wireless telecommunication or computer network including but not limited to, for example, an intranet, a wide area network (WAN), a local area network (LAN), a personal area network (PAN), a storage area network (SAN), or the Internet. The network architecture 200 can include systems and devices in addition to those shown, including other types of devices such as routers and switches.

The storage systems 211 and 212 can be implemented using a system such as the system 100 of FIG. 1. In the example of FIG. 2, the storage system 211 includes SSDs 221a-221k, and the storage system 212 includes SSDs 231a-231n. Each of the storage systems 211 and 212 may include any practicable number of SSDs. The storage systems 211 and 212 can be part of a distributed or shared storage system (e.g., a network-attached storage (NAS) system or cluster) that provides data storage services to entities in the network architecture 200 (e.g., the customers A and B that access the storage systems 211 and 212 via respective client devices 201 and 202). Those storage services may include the storage, management, and maintenance of data including large data sets commonly referred to as "big data."

The enterprise that owns and/or manages the storage systems 211 and 212 is referred to herein as a storage service provider (SSP). In an embodiment, the SSP manages the storage systems 211 and 212 via an SSP system 280. For example, the SSP system 280 can be implemented by the host system 120 of FIG. 1 that is part of one of the storage systems 211 and 212. Alternatively, the SSP system 280 may be implemented on a separate computer system that is communicatively coupled to the storage systems 211 and 212. The SSP system 280 can communicate with the storage systems 211 and 212 directly (e.g., outside the network 250, e.g., via the HBI 105 of FIG. 1) and/or via the network 250. The SSP system 280 can also communicate with the client systems 201 and 202 via the network 250.

In use, with reference to FIG. 2, entities such as customers A and B can store and access (write and read) data on the storage systems 211 and 212 via the client computer systems 201 and 202 and the SSP system 280. The SSP charges each entity (customer) a fee for storing data on the storage systems 211 and 212.

As will be described in further detail below, the amount of the fee that the SSP charges to a customer depends (at least in part) on the size of the workload for that customer. In an embodiment, the size of the workload for a customer is measured by the number of write operations performed per SSD for that customer. For example, the amount of the fee charged to customer A to store data on the SSD 221a is a function of the number of write operations performed to write that data to that SSD, the amount of the fee charged to customer A to store data on the SSD 221k is a function of on the number of write operations performed to write that data to that SSD, and so on, and the same can be said for customer B. Note that the customer workload per SSD can be a cumulative value over the lifetime of the arrangement (e.g., services contract) between the SSP and the customer. That is, for example, the amount of the fee charged to customer A for using the SSD 221a can be based on the total number of writes to that SSD for customer A.

Each of the SSDs 221a-221k and 231a-231m has a maximum number of writes that can be performed per block. The lifetime of an SSD, expressed in units of number of write operations, can be determined (estimated) by summing the maximum number of write operations of all the blocks in the SSD. If the maximum number of writes per block is constant or relatively constant, then the lifetime of the SSD can be determined by multiplying the maximum number of writes per block by the number of blocks.

In an embodiment, the quantity of data to be written to an SSD is analyzed to determine (estimate or predict) the workload (e.g., number of write operations). The estimated workload can then be divided by the lifetime of the SSD to determine a percentage of the lifetime that would be consumed by that workload once it is executed; this percentage (or fraction) is referred to herein as a utilization factor.

In another embodiment, instead of estimating the workload before it is executed as just described, the actual size of the workload is determined during or after execution of the workload. In such an embodiment, a counter can be used to determine the actual size of the workload. The value of the counter before execution of the workload is recorded. During execution of the workload, the counter value is incremented. In an embodiment, the counter is implemented on or by the controller 104 as shown in the example of FIG. 1, although the present inventions is not so limited; for example, the counter can also be implemented on or by the host system 120 or the SSP system 280. After the workload is executed, the updated counter value is used to determine the actual number of write operations performed during execution of the workload. For example, the first (recorded) value of the counter can be subtracted from the second (updated) value of the counter. The actual number of write operations can then be used to determine the utilization factor as described above.

In embodiments according to the invention, a tiered pricing schedule is used to determine the amount of the fee to be charged to a customer. In an embodiment, the tiered pricing schedule is a function of the value of the utilization factor. The greater the value of the utilization factor, the higher the amount of the fee.

The above discussion is illustrated by way of the following example (the values in the example are chosen for illustrative purposes only). If an SSD has 300 million blocks and 10,000 writes can be performed per block, then the lifetime of the SSD would be three trillion writes. A workload for customer A that utilizes five million write operations to the SSD results in a utilization factor of 0.000016 percent (%). A workload for customer B that utilizes two million write operations to the SSD would result in a utilization factor of 0.000006 percent. An example of a tiered pricing schedule is given in Table 1.

TABLE 1

Example of a Tiered Pricing Schedule

| Utilization Factor (%) | Fee Amount ($) |
|---|---|
| ≤0.00001 | 100 |
| 0.00001-0.000025 | 125 |
| 0.000025-0.00005 | 175 |
| >0.00005 | 200 |

Thus, in the example above, customer A would be charged a fee in the amount of $125 to execute their workload on the SSD, and customer B would be charged a fee in the amount of $100 to execute their workload on the SSD. Therefore, in general, the amount of the fee is larger for larger workloads.

As noted above, the utilization factor can be a cumulative value per SSD. Thus, for example, each time a workload for a customer is executed on an SSD, the number of writes associated with that workload is added to the number of writes performed to execute previous workloads using that SSD. Thus, the amount of the fee charged to the customer may increase over time. Therefore, a customer that frequently writes data to an SSD (the same SSD) may be charged more to execute a later workload than an earlier one even if the size of the later workload is smaller than the earlier ones. Consequently, a customer that writes data more frequently to an SSD may be charged more than a customer that writes data less frequently to that SSD, independent of the amount of space on the SSD that is allocated to each of the customers. In the example above, if the workload for customer A is executed only one time but customer B updates its data once per day with two million writes per update, then customer B will eventually be charged a higher fee per update than the fee charged to customer A even though customer A may be allocated more space on the SSD than customer B.

The tiered pricing schedule based on workload can be used in combination with a pricing schedule that is based on allocated space, so that customers are charged based on a combination of the two factors. Other factors may also be considered in the price.

Figure 3:
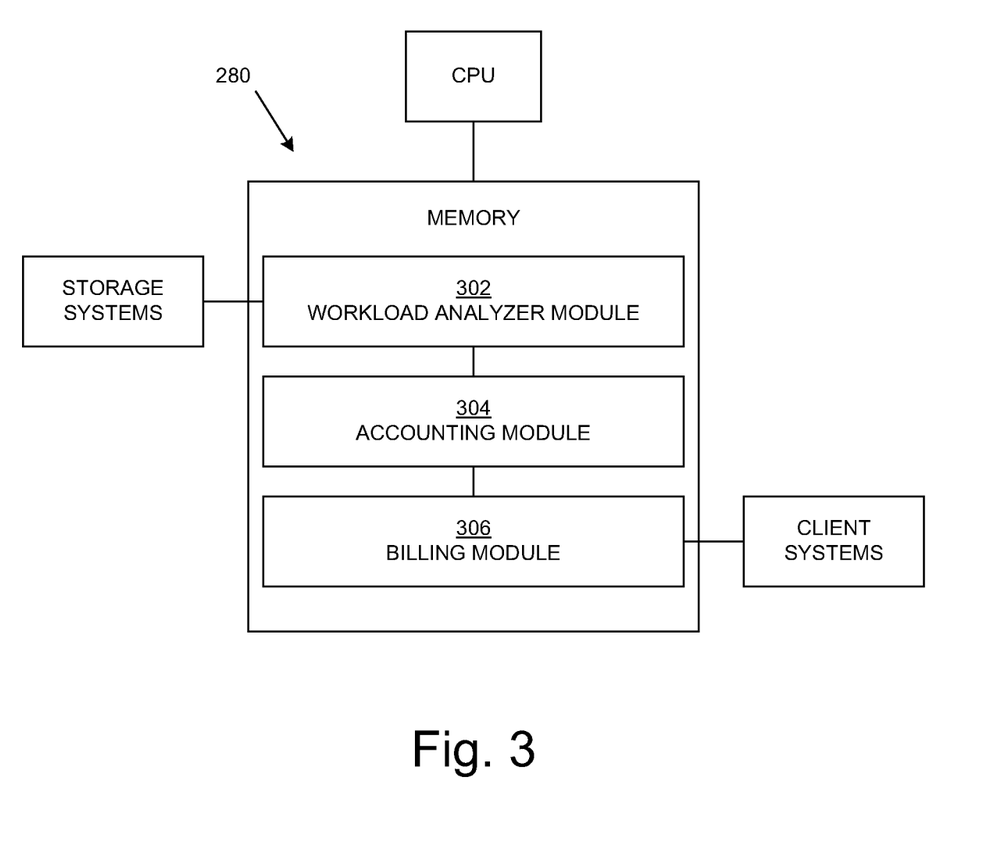
FIG. 3 is a block diagram of a storage service provider system upon which embodiments according to the present invention can be implemented.

FIG. 3 is a block diagram of an SSP system 280 upon which embodiments according to the present invention can be implemented. As mentioned above, the SSP system 280 can be implemented using the host system 120 of FIG. 1 that is part of one of the storage systems and that can communicate with the other storage systems and with the client systems. Alternatively, the SSP system 280 may be implemented on a separate computer system that includes at least a CPU and memory and that is communicatively coupled to the storage systems and to the client systems.

In the example embodiment of FIG. 3, the SSP system 280 includes a workload analyzer module 302, an accounting module 304, and a billing module 306. Although illustrated and described as separate modules, they can be implemented as part of the same application. The operations performed by the workload analyzer module 302, accounting module 304, and billing module 306 can be performed automatically by the computer system on which the SSP system 280 is implemented.

In an embodiment, the workload analyzer module 302 determines the size of the workload for a customer. In an embodiment, the workload analyzer module 302 can estimate or predict the size of the workload or determine the actual size of the workload as previously described herein. In another embodiment, the workload analyzer module 302 includes a counter for counting the actual number of write operations included in the workload. In other embodiments, the counter is implemented on or by the controller 104 or the host system 120 of FIG. 1. In the latter embodiments, the workload analyzer module 302 simply receives information providing the size of the workload from the storage systems (e.g., from the host system 120 or from the controller 104 of each storage system).

In an embodiment, the accounting module 304 determines the amount of the fee to be charged to the customer based on information about the size of the workload that is received from the workload analyzer module 302. In such an embodiment, the accounting module 304 can determine a utilization factor for the customer as described above, and can determine the fee amount using a pricing schedule based on the utilization factor. As mentioned above, the utilization factor can be a cumulative value per SSD and per customer, in which case the accounting module 304 can be used to track information needed to determine such a utilization factor.

In an embodiment, the billing module 306 is used to bill the customer the amount of the fee determined by the accounting module 304 and can also be used to record whether or not the bill has been paid. The billing module 306 can determine the amount to be billed based on the amount of the fee determined by the accounting module 304. In determining the amount to be billed, the accounting module 304 and the billing module 306 can work in concert to determine, for example, whether the customer has an outstanding balance, whether the customer is entitled to discounts or rebates, and the like. After the amount to be billed is determined, the billing module 306 can generate a bill and transmit the bill to the customer. The billing module 306 can also calculate a due date, determine whether or not the bill has been paid by the due date, and send out reminders or another bill (e.g., an updated bill that includes more recent fees in addition to the outstanding balance).

Figure 4:
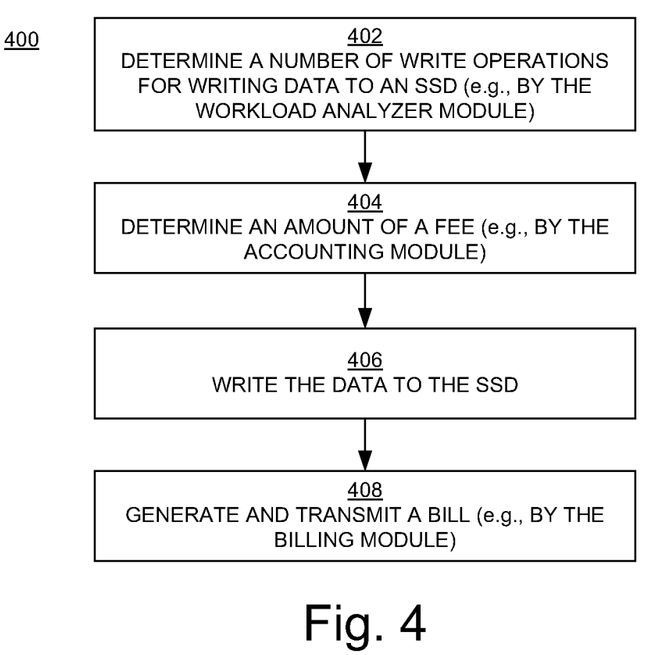
FIG. 4 is a flowchart illustrating examples of computer-implemented operations for implementing a method of determining utilization-based fees for storing data in an embodiment according to the present invention.
Figure 5:
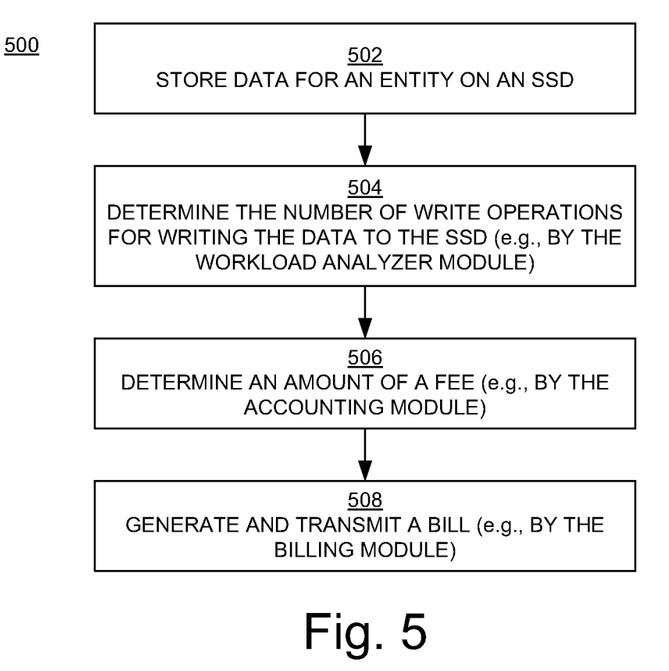
FIG. 5 is a flowchart illustrating examples of computer-implemented operations for implementing a method of determining utilization-based fees for storing data in an embodiment according to the present invention.

FIGS. 4 and 5 are flowcharts 400 and 500, respectively, illustrating examples of operations for implementing methods of determining utilization-based fees for storing data in embodiments according to the present invention. The operations can be performed per customer, or per customer per SSD.

In block 402 of FIG. 4, the number of write operations for writing data to an SSD is determined. The number of write operations may be an estimate or prediction, or it may be the actual number of write operations utilized to write the data to the SSD (e.g., the operation(s) of block 402 may be performed before or after the operation(s) of block 406 below). The actual number of write operations can be determined using a counter implemented by or on the controller 104, the host system 120, or the SSP system 280 (FIGS. 1 and 2) as previously described herein. In an embodiment, the number of write operations is determined using the workload analyzer module 302 of FIG. 3.

In block 404 of FIG. 4, an amount of a fee is determined. The amount of the fee is based on the workload associated with writing the data to the SSD. In an embodiment, the amount of the fee is based on the number of write operations (from block 402) for writing the data to the SSD. In an embodiment, the amount of the fee is determined by first determining a value for a utilization factor. The utilization factor can be determined by dividing the number of write operations by the lifetime of the SSD as previously described herein. The amount of the fee can be determined using a tiered pricing schedule that determines the amount of the fee based on the magnitude of the value of the utilization factor; the higher the value of the utilization factor, the greater the fee amount. In an embodiment, the amount of the fee is determined using the accounting module 304 of FIG. 3.

In block 406 of FIG. 4, the data is written to the SSD. In an embodiment, the number of write operations is counted as the data is written to the SSD as previously described herein. If the fee amount was based on the predicted number of write operations, the amount can be adjusted if the actual number of write operations is different from the predicted number.

In block 408, the customer is billed an amount based on the fee amount. In an embodiment, a bill is generated and transmitted to the customer by the billing module 306 of FIG. 3.

In block 502 of FIG. 5, data for an entity (e.g., a customer) is stored on an SSD.

In block 504, the size of the workload associated with writing the data to the SSD is determined. In an embodiment, the number of write operations is determined using the workload analyzer module 302 of FIG. 3. In an embodiment, the number of write operations to write the data to the SSD is determined; the number of write operations represents the size of the workload. The number of write operations may be the number associated with the execution of a single workload, or the number of write operations may be a cumulative value for that entity and that SSD.

In block 506 of FIG. 5, an amount of a fee for storing the entity's data on the SSD is determined. In an embodiment, the amount of the fee is determined using the accounting module 304 of FIG. 3. The amount of the fee is based on the size of the workload that was associated with writing the data to the SSD. In an embodiment, the amount of the fee is based on the number of write operations to the SSD performed for the entity, where as noted above the number of write operations may or may not be a cumulative value and the number of write operations may be a predicted value or the actual value.

In block 508 of FIG. 5, the customer is billed an amount that is based on the fee amount. In an embodiment, a bill is generated and transmitted to the customer by the billing module 306 of FIG. 3.

All or some of the operations represented by the blocks in the flowcharts 400 and 500 can be implemented as computer-executable instructions residing on some form of non-transitory computer-readable storage medium and performed by a computer system (e.g., the system 280 of FIG. 3, which may be implemented by the host system 120 of FIG. 1 as previously described herein). More specifically, the computer system can execute an application (consisting of one or modules as described by FIG. 3) that allows it to perform operations (e.g., the operations of FIGS. 4 and 5). A computer program containing the application may be loaded into the computer system. For example, all or a portion of the computer program stored on a computer-readable medium may be stored in the computer system's memory. When executed by the computer system's CPU, the computer program can cause the CPU to perform and/or be a means for performing some or all of the functions of the example embodiments described and/or illustrated herein. Additionally or alternatively, some or all of the functions of the example embodiments described and/or illustrated herein may be implemented in firmware and/or hardware, and/or may be implemented wholly or in part by the controller 104 of FIG. 1. Thus, some functions may be implemented by the system 280 (e.g., the host system 120) and some functions may be executed by the SSD 102 (e.g., the controller 104). For example, the controller 104 may implement the counter described above and provide the counter values to the system 280 (e.g., the host system 120), which determines the amount of the fee based on the counter values, the lifetime of the SSD, the value of the utilization factor, and the tiered pricing schedule.

In summary, embodiments according to the present invention can result in a higher fee being charged for larger workloads (e.g., workloads that require more write operations) and/or for frequent writes. Essentially, customers that incur more costs are charged more, thereby maintaining a consistent profit margin across customers. Relative to conventional approaches, SSPs can receive a greater return on investment for each SSD that they deploy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., storage as a service, software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A system, comprising:
   memories arranged in a plurality of circuit dies, the memories comprising a number of memory blocks; and
   one or more processors configured to cause:
   converting one or more logical memory addresses to one or more physical memory addresses associated with one or more memory blocks of the memory blocks, to write data to the one or more memory blocks;
   identifying one or more circuit dies of the plurality of circuit dies associated with the one or more memory blocks;
   executing one or more write operations to write the data to the one or more memory blocks that are within the one or more circuit dies of the plurality of circuit dies, based on the one or more physical memory addresses associated with the one or more memory blocks;
   determining a number of write operations that have been performed on the memories arranged in the plurality of circuit dies, wherein the number of write operations reduces a lifetime of the memories after being performed on the memories; and
   providing the number of write operations that have been performed on the memories arranged in the plurality of circuit dies, to enable tracking a percentage of the lifetime of the memories consumed by a quantity of write operations performed on the memories arranged in the plurality of circuit dies and to enable determining an amount of a fee associated with the provided number of write operations that have been performed on the memories arranged in the plurality of circuit dies,
   wherein the system is configured to perform operations comprising:
   determining the lifetime of the memories arranged in the plurality of circuit dies, based on the number of the memory blocks and a maximum number of write operations per memory block of the memory blocks; and
   providing the amount of the fee associated with the provided number of write operations that have been performed on the memories arranged in the plurality of circuit dies.

2. The system of claim 1, wherein the system is configured to perform operations comprising:
   predicting a first number of write operations, before writing the data to the one or more memory blocks that are within the one or more circuit dies of the plurality of circuit dies based on the one or more physical memory addresses associated with the one or more memory blocks.

3. The system of claim 1, wherein the system is configured to perform operations comprising:
   predicting a second number of write operations before writing any data to the memories arranged in the plurality of circuit dies for an entity.

4. The system of claim 1, wherein the determining the amount of the fee comprises:
   determining the lifetime of the memories measured in units of an amount of write operations;
   determining a value of a utilization factor by dividing the amount of write operations by the lifetime; and
   using the value of the utilization factor to determine the amount of the fee.

5. The system of claim 4, wherein the determining the amount of the fee comprises: using a tiered pricing schedule comprising different amounts of fees for different values of the utilization factor, and
   wherein the amount of the fee for a second value of the utilization factor is greater than the amount of the fee for a first value of the utilization factor that is smaller than the second value.

6. The system of claim 1, wherein the system comprises a counter, and wherein determining the number of write operations comprises determining the number of write operations using the counter.

7. The system of claim 1, wherein the system is configured to perform operations comprising:
   determining a second number of second write operations for writing data to the memories arranged in the plurality of circuit dies, the second number of second write operations associated with a first entity; and
   determining a cumulative value of a workload related to the first entity for the memories over the lifetime of the memories, the cumulative value of the workload based at least in part on the number of write operations and the second number of second write operations.

8. A method, comprising:
   converting one or more logical memory addresses to one or more physical memory addresses associated with one or more memory blocks, to write data to the one or more memory blocks, wherein memories are arranged in a plurality of circuit dies, the memories comprising a number of memory blocks, the memory blocks comprising the one or more memory blocks;
   identifying one or more circuit dies of the plurality of circuit dies associated with the one or more memory blocks;
   executing one or more write operations to write the data to the one or more memory blocks that are within the one or more circuit dies of the plurality of circuit dies, based on the one or more physical memory addresses associated with the one or more memory blocks;
   determining a number of write operations that have been performed on the memories arranged in the plurality of circuit dies, wherein the number of write operations reduces a lifetime of the memories after being performed on the memories;

determining the lifetime of the memories arranged in the plurality of circuit dies, based on the number of the memory blocks and a maximum number of write operations per memory block of the memory blocks;

providing the number of write operations that have been performed on the memories arranged in the plurality of circuit dies, to enable tracking a percentage of the lifetime of the memories consumed by a quantity of write operations performed on the memories arranged in the plurality of circuit dies and to enable determining an amount of a fee associated with the provided number of write operations that have been performed on the memories arranged in the plurality of circuit dies; and performing an operation to provide the amount of the fee associated with the provided number of write operations that have been performed on the memories arranged in the plurality of circuit dies.

9. The method of claim 8, comprising:
predicting a first number of write operations, before writing the data to the one or more memory blocks that are within the one or more circuit dies of the plurality of circuit dies based on the one or more physical memory addresses associated with the one or more memory blocks.

10. The method of claim 8, comprising:
predicting a second number of write operations before writing any data to the memories arranged in the plurality of circuit dies for an entity.

11. The method of claim 8, wherein the determining the amount of the fee comprises:
determining the lifetime of the memories measured in units of an amount of write operations;
determining a value of a utilization factor by dividing the amount of write operations by the lifetime; and
using the value of the utilization factor to determine the amount of the fee.

12. The method of claim 11, wherein the determining the amount of the fee comprises:
using a tiered pricing schedule comprising different amounts of fees for different values of the utilization factor, and
wherein the amount of the fee for a second value of the utilization factor is greater than the amount of the fee for a first value of the utilization factor that is smaller than the second value.

13. The method of claim 8, comprising:
determining a second number of second write operations for writing data to the memories arranged in the plurality of circuit dies, the second number of second write operations associated with a first entity; and
determining a cumulative value of a workload related to the first entity for the memories over the lifetime of the memories, the cumulative value of the workload based at least in part on the number of write operations and the second number of second write operations.

14. An apparatus, comprising:
means for converting one or more logical memory addresses to one or more physical memory addresses associated with one or more memory blocks, to write data to the one or more memory blocks, wherein memories are arranged in a plurality of circuit dies, the memories comprising a number of memory blocks, the memory blocks comprising the one or more memory blocks;

means for identifying one or more circuit dies of the plurality of circuit dies associated with the one or more memory blocks;

means for executing one or more write operations to write the data to the one or more memory blocks that are within the one or more circuit dies of the plurality of circuit dies, based on the one or more physical memory addresses associated with the one or more memory blocks;

means for determining a number of write operations that have been performed on the memories arranged in the plurality of circuit dies, wherein the number of write operations reduces a lifetime of the memories after being performed on the memories;

means for determining the lifetime of the memories arranged in the plurality of circuit dies, based on the number of the memory blocks and a maximum number of write operations per memory block of the memory blocks;

means for providing the number of write operations that have been performed on the memories arranged in the plurality of circuit dies, to enable tracking a percentage of the lifetime of the memories consumed by a quantity of write operations performed on the memories arranged in the plurality of circuit dies and to enable determining an amount of a fee associated with the provided number of write operations that have been performed on the memories arranged in the plurality of circuit dies; and means for performing an operation to provide the amount of the fee associated with the provided number of write operations that have been performed on the memories arranged in the plurality of circuit dies.

15. The apparatus of claim 14, comprising:
means for predicting a first number of write operations, before writing the data to the one or more memory blocks that are within the one or more circuit dies of the plurality of circuit dies based on the one or more physical memory addresses associated with the one or more memory blocks.

16. The apparatus of claim 14, comprising:
means for predicting a second number of write operations before writing any data to the memories arranged in the plurality of circuit dies for an entity.

17. The apparatus of claim 14, wherein the means for determining the amount of the fee comprises:
means for determining the lifetime of the memories measured in units of an amount of write operations;
means for determining a value of a utilization factor by dividing the amount of write operations by the lifetime; and
means for using the value of the utilization factor to determine the amount of the fee.

18. The apparatus of claim 17, wherein the means for determining the amount of the fee comprises:
means for using a tiered pricing schedule comprising different amounts of fees for different values of the utilization factor, and
wherein the amount of the fee for a second value of the utilization factor is greater than the amount of the fee for a first value of the utilization factor that is smaller than the second value.

19. The apparatus of claim 14, wherein the apparatus comprises a counter, and wherein the means for determining the number of write operations comprises means for determining the number of write operations using the counter.

20. The apparatus of claim 14, comprising:
means for determining a second number of second write operations for writing data to the memories arranged in the plurality of circuit dies, the second number of second write operations associated with a first entity; and
means for determining a cumulative value of a workload related to the first entity for the memories over the lifetime of the memories, the cumulative value of the workload based at least in part on the number of write operations and the second number of second write operations.

* * * * *